March 10, 1936. J. R. THORP 2,033,454
VEHICLE VENTILATING DEVICE
Filed Sept. 25, 1933 2 Sheets-Sheet 1
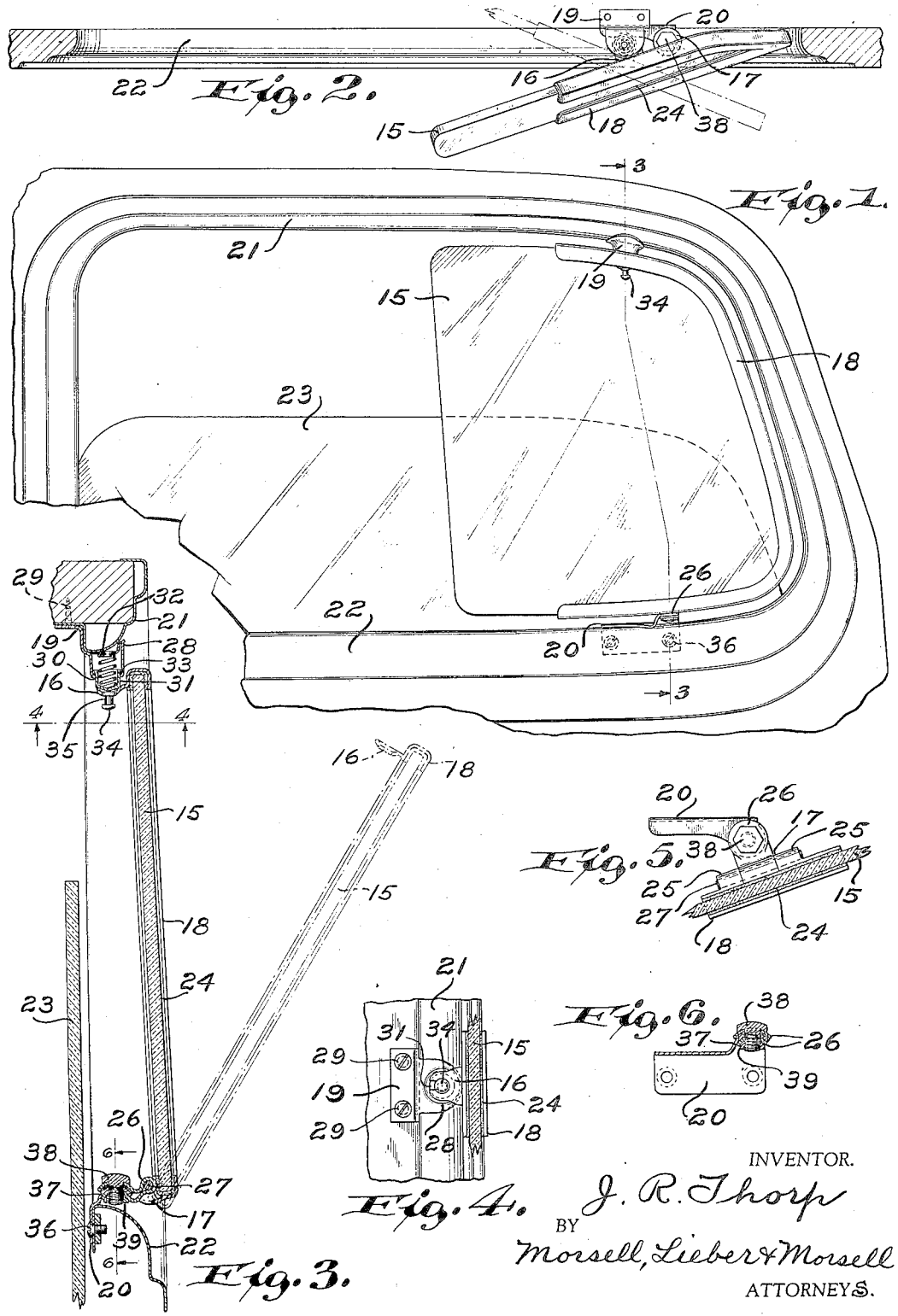

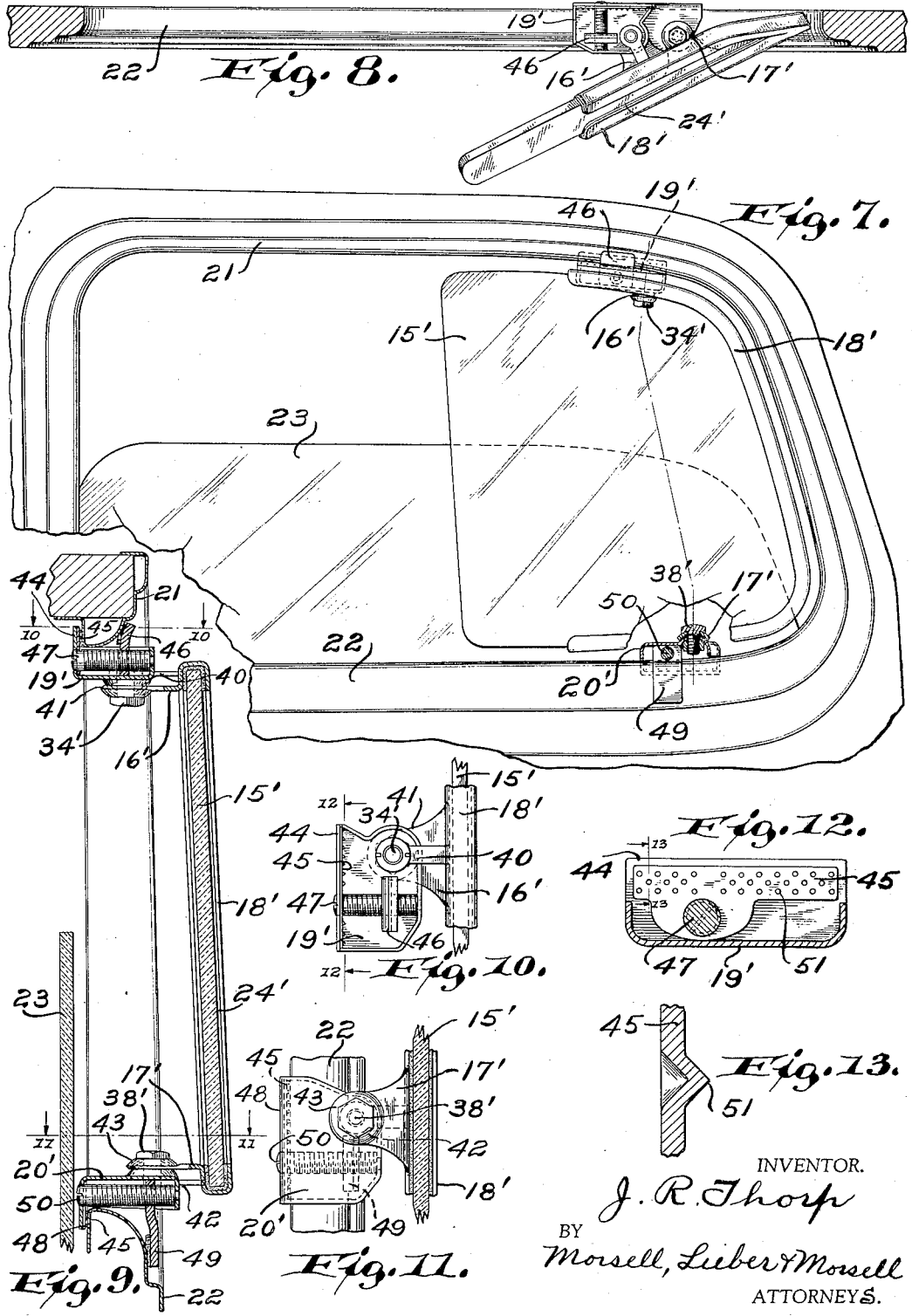

Patented Mar. 10, 1936

2,033,454

UNITED STATES PATENT OFFICE 2,033,454

VEHICLE VENTILATING DEVICE

Joel R. Thorp, West Allis, Wis., assignor to The Fulton Company, West Allis, Wis., a corporation of Wisconsin Application September 25, 1933, Serial No. 690,822

8 Claims. (Cl. 296—84)

The present invention relates in general to improvements in the art of ventilation, and relates more specifically to improvements in the construction and operation of ventilating wings especially adapted for cooperation with the side windows of vehicles in order to enhance the health and comfort of the occupants.

Generally defined, an object of the invention is to provide an improved vehicle ventilating device, which is simple and durable in construction, and which is moreover highly efficient in use.

It has long been customary to utilize auxiliary deflector shields or wings in conjunction with the vertically adjustable side windows of automobiles, for the purpose of eliminating undesirable drafts or for enhancing the circulation of air within the vehicle enclosure. Due to repeated and drastic changes in motor vehicle designs, it is found difficult, and in some cases, impossible to attach these auxiliary wings to the reveals of the side windows so as to permit necessary swinging adjustment of the shields, without subjecting the same to undesirable stresses and strains, and so as to avoid looseness and consequent rattling. In most cases it is preferred to have these auxiliary ventilating shields formed of transparent material, and located as near to the body of the car as possible, but such location of the wings necessarily obstructs access to the outer surfaces of the adjacent main windows for cleaning purposes. The manufacturer of these auxiliary window wings is therefore confronted with the problems of providing shields which are adapted to be durably attached to the main window reveals, which are capable of pivotal adjustment about non-alined upper and lower pivots, and which will be located as close as possible to the main windows while avoiding obstruction to cleaning of the latter.

It is a more specific object of the present invention to provide an improved window wing which solves all of these problems in a most effective manner, and which may be either permanently or removably attached to the side reveals of any of the various types of automobiles now on the market.

Another specific object of the invention is to provide an improved vehicle ventilating shield adapted to be supported from the upper and lower reveals of a main window by pivots having non-alined axes, and in such a manner that the shield may be conveniently adjusted without subjecting the same to excessive stress.

Still another specific object of the invention is to provide an auxiliary windshield which may be either permanently or detachably attached to reveals of various shapes, and which may also be positioned closely adjacent to the main window with which the shield cooperates, without interfering with the normal opening and closing of the window.

A further specific object of the invention is to provide a durable window wing structure, which may be readily manufactured and applied to a vehicle, and which presents an extremely attractive and neat appearance when finally installed.

Another specific object of the invention is to provide a ventilating wing assemblage which will permit rapid pivotal adjustment of the shield relative to the main window with which the device is associated, and which may also be removed from the vehicle without marring the finish of the latter.

These and other objects and advantages of the present improvement will be apparent from the following detailed description, and the feature of temporarily removing the improved shields so as to permit access to the external surfaces of the main windows for cleaning purposes, constitutes no part of the present invention and, in fact, forms the subject of another application.

A clear conception of embodiments of the features constituting the present invention, and of the mode of constructing and of manipulating ventilating shields built in accordance with this improvement, may be had by referring to the drawings accompanying and forming a part of this specification in which like reference characters designate the same or similar parts in the various views.

Fig. 1 is a side elevation of the upper portion of the front side door of an automobile, showing one of the improved ventilating shields permanently attached thereto adjacent to the upper and lower window reveals;

Fig. 2 is a horizontal section through the upper portion of the door, and a full top view of the ventilating shield;

Fig. 3 is an enlarged section through the door and ventilating shield, taken along the irregular line 3—3 of Fig. 1;

Fig. 4 is a fragmentary horizontal section through the door and ventilating shield, taken along the line 4—4 of Fig. 3 and looking upwardly;

Fig. 5 is a fragmentary top view of the lower supporting structure of the ventilating shield of Figs. 1, 2 and 3;

Fig. 6 is a vertical section through the lower supporting structure, taken along the line 6—6 of Fig. 3;

Fig. 7 is a part sectional side elevation of the upper portion of the forward side door of an automobile, showing another form of the improved ventilating shields removably attached to the upper reveals and lower reveals of the main window;

Fig. 8 is a horizontal section through the upper portion of the door of Fig. 7, and a full top view of the modified ventilating shield;

Fig. 9 is an enlarged section through the door and ventilating shield of Figs. 7 and 8, taken through the upper and lower supporting brackets adjacent to the clamps;

Fig. 10 is a top view of the upper support for the modified ventilating shield, taken at the line 10—10 of Fig. 9;

Fig. 11 is a top view of the lower support for the modified ventilating shield, taken at the line 11—11 of Fig. 9;

Fig. 12 is a further enlarged vertical section through the upper support for the shield, taken along the line 12—12 of Fig. 10; and Fig. 13 is a still further enlarged fragmentary transverse section through the gripping plate, the section being taken along the line 13—13 of Fig. 12.

Referring to Figs. 1 to 6 inclusive of the drawings, the improved ventilating device therein illustrated, comprises in general a transparent shield 15 preferably formed of plate glass; upper and lower pivot elements 16, 17 secured to a channel strip 18 which is permanently attached to the forward portion of the shield 15; and upper and lower bracket elements 19, 20 coacting with the pivot elements 16, 17 respectively and adapted for attachment to the upper and lower reveals 21, 22 of the main window 23.

A sheet 24 of resilient material may be inserted between the channel strip 18 and the adjacent edge of the shield 15, and the upper pivot element 16 merely comprises a bifurcated lug rigidly attached to the upper inner side portion of the strip 18 and having a spherical upper surface at the bifurcations thereof generated about a center located laterally of the plane of the shield 15, as shown in Figs. 3 and 4. The lower pivot element 17 comprises a pair of spaced ears 25 rigidly attached to the lower inner side portion of the strip 18, and a member 26 extending into the space between the ears 25 and hingedly attached thereto by means of a pivot pin 27, see Figs. 3 and 5. The member 26 has upper and lower spherical portions located laterally of the plane of the shield 15, and a substantial distance in front of the vertical axis of the spherical surface of the upper element 16 as indicated in Figs. 1 and 2. The portion of the strip 18 between the ears 25 is bent to coact with the lower part of the member 26 so as to provide a limit stop for the outward swinging of the shield 15.

The upper bracket element 19 comprises a bracket 28 adapted to be secured to the main window frame at the upper reveal 21, by screws 29, and having an opening 30 within which a plunger 31 is slidable. The plunger 31 is constantly urged in a downward direction by means of a compression spring 32 confined within the bracket 28, and the downward travel of this plunger is limited by a stop flange 33 formed thereon. The lower end of the plunger 31 is provided with a spherical surface which is cooperable with the spherical upper surface of the bifurcations of the pivot element 16, and a pin 34 having a reduced portion 35 is attached centrally to the lower end of the plunger 31. When the plunger 31 is moved upwardly to compress the spring 32, the bifurcations of the pivot element 16 may be shifted laterally of the pin 34 and through the annular groove formed by the reduced portion 35 so as to release the pivotal coaction between the upper pivot and bracket elements 16, 19. When these elements 16, 19 are positioned as shown in Fig. 3, the enlarged upper portion of the pin 34 seats loosely within the enlarged circular opening between the bifurcations of the upper pivot elements 16 and the spherical surfaces of the elements 16, 19 coact with each other to provide for limited universal pivotal movement of the coacting elements and to prevent lateral separation thereof, at the upper end of the shield 15.

The lower bracket element 20 is formed in one piece adapted for attachment to the inside surface of the lower reveal 22 adjacent to the main window 23, by means of bolts 36 and lock nuts coacting therewith as shown in Fig. 3. The bracket 20 has a spherical lip 37 adapted to be interposed between the upper and lower spherical portions of the member 26, and a pivot bolt 38 loosely penetrates the coacting spherical portions of the lower elements 17, 20 and cooperates with a friction washer and with a lock nut 39 to frictionally retain these elements in various positions of pivotal adjustment. These coacting spherical bearing portions of the lower pivot and bracket elements 17, 20, also provide for limited universal pivotal movement of the coacting elements at the lower portion of the shield 15, and the pivot pin 27 permits free outward swinging of the shield 15 when the upper pivotal connection is released in the manner heretofore described.

The improved ventilating device just described, is shown fully assembled in Figs. 1, 2 and 3, and when thus assembled, the shield 15 may be swung to any desired angular position relative to the main window 23, so as to either prevent air from entering the vehicle enclosure while moving forwardly, or to cause more air to be scooped into the enclosure. When the shield 15 is disposed at limited angles relative to the window 23, this window may be vertically adjusted without interference by the ventilating device, and the shield 15 may be readily released and swung to the dot-and-dash line position of Fig. 3 so as to permit unobstructed cleaning of the outer surface of the main window 23, by merely pressing upwardly upon the pivot pin 34. The limited universal movement provided for by the upper and lower pivot and bracket elements coacting as they do along spherical surfaces, permits attachment of the bracket elements 19, 20 to non-parallel and non-alined portions of the window frame, without subjecting the shield 15 to excessive strains during adjustment thereof, and the rigidity of the structure is also enhanced by the channel strip 18 which additionally protects the front edge of the shield 15. When the shield 15 is not in use for ventilating purposes, it may be swung to a position substantially flush with the external bounding surface of the window frame by virtue of the disposition of the pivotal axes closely adjacent to the main window 23, and the double clamping afforded by the member 26 coacting with the intervening lip 37 of the lower bracket element 20, prevents undesirable shifting of the shield 15 out of adjusted position.

Referring to Figs. 8 to 13 inclusive of the drawings, the improved ventilating device shown therein, is quite similar in structure and operation to that just described, but is adapted for removable attachment to irregular reveals of automobiles, without undesirably marring the finish of the normally exposed attaching surfaces. This modified ventilating device comprises in general a transparent shield 15'; upper and lower pivot elements 16', 17' secured to a channel strip 18' which is permanently attached to the forward portion of the shield 15'; and upper and lower bracket elements 19', 20' coacting with the pivot elements 16', 17' respectively and adapted for detachable attachments to the upper and lower reveals 21, 22 of the main window 23.

As in the case of the ventilating device previously described, a sheet 24' of resilient material may be inserted between the channel strip 18' and the adjacent edge of the shield 15', and the upper and lower pivot elements 16', 17' may be formed integral with the channel strip 18' and project laterally therefrom toward the main window 23. The upper element 16' has a pair of spaced downwardly concave spherical portions 40, 41 at the inner end thereof, which are disposed respectively above and below an intervening downwardly concave spherical integral portion of the upper bracket element 19', and these spherical coacting portions are frictionally pivotally connected by a pivot bolt 34'. The lower element 17' also has a pair of spaced but upwardly concave spherical portions 42, 43 at its inner end, which are disposed respectively below and above an intervening upwardly concave spherical integral portion of the lower bracket element 20', and these coacting spherical portions are likewise frictionally pivotally connected by a pivot bolt 38'. The bolts 34', 38' may be similar to the bolt 38 previously referred to, and cooperate with friction washers and with lock nuts as previously described, in order to provide for the desired frictional resistance at the pivots.

The upper detachable clamping bracket element 19' is shown in detail in Figs. 9 and 10, and has an inner clamping flange 44 cooperable with the inner surface of the upper reveal 21 through a grip plate 45, and a clamping plate 46 cooperable with the outer surface of the reveal 21 and movable toward and away from the flange 44 by means of a jack screw 47 which is journalled in the bracket element 19'. The lower detachable clamping bracket element 20' is shown in Figs. 9 and 11, and also has an inner clamping flange 48 cooperable through a grip plate 45 with the inner surface of the lower reveal 22, and a clamping plate 49 cooperable with the outer surface of the reveal 22 and movable toward and away from the flange 48 by means of a jack screw 50 journalled in the bracket element 20'. The grip plates 45 have portions embracing the adjacent jack screws, and are provided with sharp teeth 51 as shown in Figs. 12 and 13, in order to prevent slippage of the bracket elements 19', 20'; and felt pads may be inserted between the clamping plates and the adjacent reveals 21, 22.

When the modified ventilating device has been properly assembled and applied to the window reveals 21, 22 as illustrated in Figs. 7, 8 and 9, the jack screws 47, 50 may be manipulated to rigidly clamp the bracket elements 19', 20' against the adjacent upper and lower reveals 21, 22, and the grip plates 45 assist in maintaining such rigid connection. By virtue of the spherical formation of the surfaces of coaction between the bracket elements 19', 20' and the pivot elements 16', 17' respectively, the shield 15' may be swung to various positions of adjustment, in spite of the fact that the pivot bolts 34', 38' are not in alinement with each other. This permits use of the device on non-alined reveals 21, 22 without excessively stressing the shield, and the frictional resistance afforded by clamping the spherical portions of the bracket elements 19', 20' between the spaced spherical portions of the pivot elements 16', 17' respectively, produces a rigid structure and also permits retention of the various positions of adjustment of the shield. Because of the fact that the shield 15' is located outside of the main window opening and at some distance from the window 23, it is not necessary in this modified ventilating device, to provide for horizontal outward swinging of the shield so as to permit cleaning of the outer surface of the main window as in the device previously described. This remote spacing of the shield 15' and window 23 also permits greater range of swinging adjustment of the shield in either direction, without interfering with the vertical adjustment of the main window 23, but causes the ventilating device to project farther away from the window frame especially when not in use for ventilating purposes. By locating the upper pivotal axis nearer the plane of the deflector shield 15 than the lower pivotal axis, the shield will more closely follow the inclination of the sloping external side surface of the vehicle body, when the shield is in normal position as shown in Fig. 3; and this disposition of the pivotal axes at different distances laterally away from the shield will also cause the forward inclined edge of the latter to more effectively coact with the front upwardly tapering and rearwardly inclined reveal, when the shield is swung to the position shown in Fig. 2.

From the foregoing description, it will be apparent that the present invention provides a ventilating device which may be either permanently or detachably attached to the upper and lower irregular reveals 21, 22 of various types of vehicles, so as to permit free angular adjustment and fixed positioning of the shield without subjecting the same to excessive stresses. The various supporting elements of the devices may be formed of sheet metal and finished to present a neat and attractive appearance, and the front edge of the shield is effectively protected by the one-piece channel strip which also enhances the rigidity of the structure. The improved ventilating device has proved highly successful in commercial use, and may be manufactured and sold at minimum cost.

It should be understood that it is not desired to limit the invention to the exact details of construction and to the precise mode of use, herein shown and described, for various modifications within the scope of the claims may occur to persons skilled in the art.

It is claimed and desired to secure by Letters Patent:

1. In combination, a deflector shield, a pivot element secured to an edge of said shield, a bracket element coacting with said pivot element to support said shield from a window reveal, one of said elements having spaced spherical surfaces and the other element having a spherical portion articulable between said surfaces, and non-alignable pivots disposed laterally of the plane of said shield, one of said pivots coacting with said spherical portions of said elements so as to permit limited universal motion at said surfaces.

2. In combination, a deflector shield, pivot elements secured to the upper and lower edges of said shield, a bracket element coacting with each of said pivot elements to support said shield from a window reveal, one element of at least one of said sets having spaced spherical surfaces and the other element of the same set having a spherical portion articulable between said surfaces, and non-alined pivots disposed laterally of the plane of said shield and connecting the elements of each set, one of said pivots penetrating said surfaces.

3. In combination, a deflector shield, pivot elements secured to the upper and lower edges of said shield, a bracket element coacting with each of said pivot elements to support said shield from a window reveal, one element of each set having spaced spherical surfaces and the other element of the same set having an integral spherical portion articulable between said surfaces, and a pivot connecting the coacting spherical portions of the elements of each set, said pivots being disposed laterally of the plane of said shield and having non-alined axes.

4. In combination, a deflector shield, a pivot element secured to an edge of said shield, a bracket element coacting with said pivot element to support said shield from a window reveal, said pivot element having spaced spherical surfaces and said bracket element having a spherical portion articulable between said surfaces, and non-alignable pivots one of which coacts with said spherical element portions, said pivot being disposed laterally of the plane of said shield.

5. In combination, a deflector shield having a one-piece rigid supporting strip embracing the front and portions of the top and bottom edges thereof, pivot elements formed integral with the upper and lower portions of said strip, bracket elements coacting with said pivot elements, and a universal joint between each of said pivot elements and the adjacent bracket element, the axes of said joints being nonalined and disposed different distances laterally away from the plane of said shield.

6. In combination, a deflector shield, bracket elements universally pivotally attached to the opposite edges of said shield, an adjustable clamping plate carried by each of said elements, a screw for adjusting each of said plates, and a gripping plate interposed between each of said elements and the corresponding clamping plate, said gripping plates having points engageable with an adjacent supporting reveal and some of said plates being pierced by the adjacent adjusting screws.

7. In combination, a deflector shield, upper and lower pivot elements having spherical zone surfaces projecting laterally from the opposite edges of said shield, a bracket element coacting with each of said pivot elements to support said shield from a window reveal, each of said bracket elements having at least one spherical zone surface cooperable with the spherical zone surface of the adjacent pivot element and the cooperating elements of one of said sets having vertically spaced coacting spherical zone surfaces, and a pivot connecting the coacting spherical portions of the elements of each set, said pivots being non-alined and disposed laterally of the plane of said shield.

8. In combination, a deflector shield, upper and lower pivot elements having spherical zone surfaces projecting laterally from the opposite edges of said shield, a bracket coacting with each of said pivot elements to support said shield from a window reveal, each of said brackets having at least one spherical zone surface cooperable with the spherical zone surface of the adjacent pivot element and the lower bracket having vertically spaced spherical zone surfaces coacting with similarly spaced similar surfaces of the lower pivot element, and a pivot connecting the coacting spherical portions of each bracket and pivot element, said pivots having non-alined axes and being disposed different distances laterally away from the plane of said shield.

JOEL R. THORP.